United States Patent [19]

Gutjahr et al.

[11] Patent Number: 4,994,220
[45] Date of Patent: Feb. 19, 1991

[54] PROCESS FOR INJECTION MOLDING OF INJECTION MOLDED PARTS OF PLASTICIZED LIQUID CRYSTAL POLYMER MATERIAL

[75] Inventors: Lothar Gutjahr, Malterdingen; Wolfgang Nesch, Lahr-Sulz, both of Fed. Rep. of Germany

[73] Assignee: Kloeckner Ferromatik des GmbH, Malterdingen, Fed. Rep. of Germany

[21] Appl. No.: 590,528

[22] Filed: Sep. 28, 1990

Related U.S. Application Data

[63] Continuation of Ser. No. 329,838, Mar. 28, 1989, abandoned.

[30] Foreign Application Priority Data

Mar. 31, 1988 [DE] Fed. Rep. of Germany ....... 3810954

[51] Int. Cl.⁵ .............................................. B29C 45/00
[52] U.S. Cl. ...................................... 264/69; 264/108; 264/328.8; 264/328.12; 425/573
[58] Field of Search .................. 264/69, 328.8, 328.12, 264/40.1, 40.5, 40.7, 23, 24, 71, 72, 108, 328.13; 425/555, 567, 573, 580, 583, 130

[56] References Cited

U.S. PATENT DOCUMENTS

| | | | |
|---|---|---|---|
| 2,296,730 | 9/1942 | Muller et al. | 425/573 |
| 3,331,904 | 7/1967 | Friedman | 425/555 |

FOREIGN PATENT DOCUMENTS 2170142 7/1986 United Kingdom .

OTHER PUBLICATIONS

P. S. Allen, M. J. Bevis, P.C. Emeanuwa and J. R. Gibson; Eliminating Weld Lines in Injection Moulding by Controlled Orientation; Plastics on the Road 1986; pp. 19/1-19/9; Dec. 3-4, 1986.
P. S. Allan and M. J. Bevis; Multiple Live-Feed Injection Moulding; Plastics and Rubber Processing and Applications; vol. 7, Nov. 1, 1987.
Engineering and Processing News; Modern Plastics International, p. 22, Nov. 1985.
P. S. Allan and M. J. Bevis; Multi Live-Feed Molding for Avoidance of Microporosity and for the Production of Specified Fibre Orientation and Distributions in Fibre Reinforced Materials; ICCM & ECCM; vol. 1; pp. 1.144–1.149.

*Primary Examiner*—Jill L. Heitbrink
*Attorney, Agent, or Firm*—Watson, Cole Grindle & Watson

[57] ABSTRACT

A process and apparatus for injection molding of injection molded parts of plasticized material, in particular plasticized liquid crystal polymers, in which the plasticized material is injected into the mold cavity of a closed injection mold having at least two spaced apart infeed gates, separate plastification and injection devices being associated with each of the gates. The plasticized material may be further injected into the mold cavity to compensate for any shrinkage during cooling of the molded material. Injection is carried out by at least one of the devices which causes the material to flow into the cavity via one of the gates associated therewith for filling the cavity and causing the material to partially flow from the cavity via the other of the gates in the direction of the other of the devices associated therewith.

6 Claims, 1 Drawing Sheet

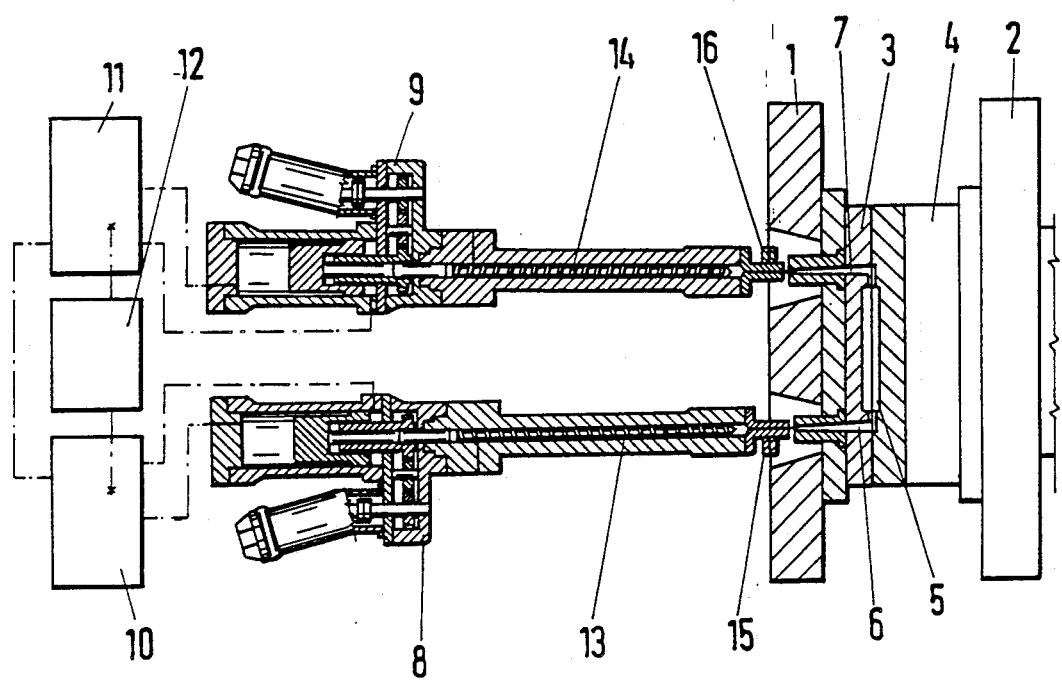

PROCESS FOR INJECTION MOLDING OF INJECTION MOLDED PARTS OF PLASTICIZED LIQUID CRYSTAL POLYMER MATERIAL

This application is a continuation of application Ser. No. 329,838, filed Mar. 28, 1989, now abandoned.

BACKGROUND OF THE INVENTION

This invention relates to a process and apparatus for injection molding of injection molded parts of plasticized material, in particular plasticized liquid crystal polymers, wherein the plasticized material is injected into the mold cavity of a closed injection mold having at least two spaced apart infeed gates each associated with a plastification and injection device. Any shrinkage that occurs during the cooling of the injection molded parts can be compensated by further injection of the material.

The plasticized material referred to herein includes conventional plasticized thermoplastic material, granulated mixtures of isocyanate and a polyol, unburned ceramic compounds with added organic lubricants, elastomers, reinforced plastic material having added glass fibers, carbon fibers, metal powder, etc., that are completely reacted into polyurethane.

In accordance with current procedures for injection molding of injection molded parts of plasticized material, such material is extruded via an infeed gate into the mold cavity of a closed injection mold, and the shrinkage of the molded part that occurs upon cooling is compensated by the additional injection of plasticized material. And, injection molded parts can be molded of different plastic materials through multi-component injection.

Depending on the geometry, dimensions and wall thickness of the injection molded part during extrusion of the plasticized material into the closed injection mold, considerable injection pressures are required to produce fault-free injection molded parts. Correspondingly high mold locking pressures are therefore necessary to prevent the injection mold from inadvertently opening.

Currently it has been the practice to essentially direct attention to controlling and regulating the flow of the injection process in order to produce fault free, dimensionally stable and dimensionally accurate injection molded parts. A targeted flow of plasticized material into the mold cavity for a preset orientation of, for example, neutral fibers to effect optimum mechanical strength or loadability of the injection molded parts has up until now not been made possible.

From other fields of engineering of, for example, forged parts, it is known how to effect optimum strength or loadability of workpieces by correspondingly presetting the fiber orientation.

SUMMARY OF THE INVENTION

It is an object of the present invention to avoid the problems experienced with prior injection molding techniques by the provision of a process for the injection molding of injection molded parts of plasticized material, in particular of plasticized liquid crystal polymers, wherein the plasticized material is extruded into the mold cavity of a closed injection mold having at least two spaced apart infeed gates each associated with a separate plastification and injection device in order to preset a targeted fiber and stress orientation of the injected material in the mold. And, if desired, the shrinkage that occurs during cooling of the injection molded parts is compensated by further injection of the material.

Injection is carried out by one of the plastification and injection devices via one of the gates associated therewith for filling the cavity, the injected material partially flowing from the cavity via the other gate in the direction of the other plastification and injection device.

According to the invention the plasticized material flows through the one gate in the direction of the other plastification and injection device. During this process hydraulic pressures acting on the plastification and injection screws of the devices are preset in such a manner that the plasticized material is under a predetermined pressure. While the one plastification and injection screw delivers the material in the direction of its associated gate, the other plastification and injection screw moves material away from its associated gate during which it can also plasticize the granulated material fed into that device. After the mold cavity has been filled, the further axial movement effected by the two plastification and injection screws is stopped and at one or both plastification and injection screws a corresponding pressure is applied under which the injection molded part is cooled while shrinkage is compensated for, if desired. The buildup of typically high internal pressures in the closed injection mold while filling the mold cavity is avoided by the approach taken according to the invention so that conventional high mold locking pressures are no longer required.

Of particular advantage is that due to the target arrangement of the two infeed gates with respect to the geometry and the dimensions of the mold cavity a targeted flow pattern of the plasticized material in the mold cavity is effected and the orientation of the fibers, in particular the orientation of neutral fibers, can be preset.

Of further advantage is that long molecules or molecular chains and glass fibers, carbon fibers, etc. are oriented in the direction of flow into and from the cavity and thus significantly increases the strength of the molded parts.

While the mold cavity is being filled, the two plastification and injection devices may be operated to alternately feed the plasticized material into the mold cavity. This alternate feed can occur in such a manner that the two plastification and injection devices inject all of the material in subquantities into the cavity required to produce an injection molded part, such that the direction of flow of material may be reversed from time to time. For long molecules or molecular chains, in particular, an orientation in the direction of flow due to the multiple directional reversals of the direction of flow occurs without additional effort or means applied.

After the mold cavity has been filled by operation of the two plastification and injection devices, the plasticized material is moved back and forth within the mold cavity by operation of the devices. Such back and forth movement may be carried out in dependence on the cooling speed of the injection molded part. Due to the cooling of the injection molded parts, wherein the cooling takes place from the inner wall of the mold in the direction of the interior of the injection molded part and shearing zones in which the orientation of the molecules or molecular chains occur, form the interior of the injection molded parts so that an orientation of the molecules and the targeted orientation of the fibers is effected over the entire cross section of the molded part.

The plastification and injection devices may be operated for moving the plasticized material back and forth within the mold cavity at given intervals. Accordingly, the speed of the material flowing back and forth can be largely controlled due to the inertia of the flowing material to effect optimum orientation of the molecules or molecular chains.

The two infeed gates of the closed injection mold may be arranged diametrically opposite one another so that the mold cavity may function in the manner of a gate while the plasticized material is flowing. This arrangement has particular advantage for injection molded parts that are cylindrical or rotationally symmetrical.

Generally, the infeed gates can be arranged in any arbitrary manner and, in particular, in consideration of the geometry of the cavity so that their correspondingly preset fiber orientation or stress pattern in the injection molded part is targeted. Thus, for example, for the extrusion of an L-shaped profile the axes of the gates may intersect at a 90° angle so that during the extrusion of such profile an L-shaped orientation of the fibers is effected.

For changing the direction of flow in the cavity the plasticized material may be injected via at least one further pair of gates alternating with a first pair of gates so that the injection molded part is extruded in two layers. The arrangement of the two pairs of gates facilitates presetting the fiber orientation or stress pattern of the two layers in such a manner that it is moved by 90° to the direction of the fiber or stress of the first layer. Thus, injection molded parts can be extruded in several layers by the corresponding arrangement of the other pairs of gates of the multi-layer gate, whereby the fiber orientation of the overlying layers is staggered. And, the levels of gates can be oriented by pairs and alternately in different directions for extruding the injection molded part in overlying layers.

While the plasticized material flows in the direction of one or the other plastification and injection devices, the cavity is ventilated. As a result the plasticized material that flows into the cavity and continues to flow in the direction of the other plastification and injection unit moves the air in the cavity ahead of it and along its path delivers it at a suitable point to the ambient via a valve.

In carrying out the aforedescribed process the apparatus of the invention has at least two plastification and injection devices and a closed injection mold with a mold cavity having at least two spaced apart infeed gates opening into the cavity, the devices are being respectively associated with the gates for separately or alternately injecting the material into the cavity thorugh one and/or the other of the gates.

The injection mold cavity communicates with each of the plastification and injection devices via the infeed gates. By communication is meant that the plasticizing material of both the plastification and injection devices is injected alternately into the cavity and also flows in a controlled manner alternately in the direction of one or the other of such devices. As a result the plasticizing material is fed into the cavity with a predetermined differential pressure that is exerted by the screws of the plastification and injection devices.

BRIEF DESCRIPTION OF THE DRAWING

The single drawing is a top plan view, in section, of the apparatus according to the invention with parts of the apparatus not necessary to the understanding of the invention being omitted for the sake of clarity.

DETAILED DESCRIPTION OF THE INVENTION

In the drawing, stationary platens 1 and 2 are shown which are capable of being moved on upright columns (not shown). Mold halves 3 and 4 of closed injection molds are clamped on the sides of the platens 1 and 2 facing one another for each forming a mold cavity 5 in a manner known in the art.

Mold half 3 clamped on stationary platen 1 has two spaced apart infeed gates 6 and 7 opening into cavity 5. Separate plastification and injection devices 8 and 9 are respectively associated with infeed gates 6 and 7. Each such device may be in the form of that disclosed in U.S. Pat. No. 4,592,712 commonly owned herewith. The entirety of that disclosure is therefore specifically incorporated herein by reference.

Conventional hydraulic control means 10 and 11 are operatively connected, respectively, with devices 8 and 9, and electrical control means 12 is operatively connected with control means 10 and 11 for together controlling the intended operation of each plastification and injection device. Each device has an injection screw 13 or 14 mounted within its housing which upon rotation about its central axis causes the granules of plastic material to be plasticized and fed into the mold cavity via the associated gates 6 and 7.

Vent valves for the air, dispelled from the mold cavity and the gates, are shown as at 15, 16 on devices 13 and 14.

Upon operation of the device plasticized material is fed downstream of the tip of the injection screw of each device. Injection is carried out by operation of at least one device 8, 9 which causes plasticized material to flow into cavity 5 via one of the gates 6, 7 associated with such one device for filling the cavity and causing the plasticized material to partially flow from the cavity via the other of the gates in the direction of the other of the devices 8, 9 associated therewith. While the cavity is being filled and the plasticized material is being moved therein, such material forms a cohering current and due to the preset hydraulic pressures in the injection cylinders it is under a preset differential pressure and flows with corresponding speed in both directions through the gates and the cavity.

After the mold cavity has been filled and further delivery of the plasticized material has been interrupted, plasticized material is further injected into the mold cavity at high pressure to compensate for shrinkage of the cooling injection molded part.

What is claimed is:

1. A process for injection molding of injected molded parts of plasticized liquid crystal polymers, comprising the steps of:

associating a separate plastification and injection device with each of at least two spaced apart infeed gates of a closed injection mold defining a mold cavity containing a set quantity of plasticized material when full;

injecting a subquantity of the plasticized material into the mold cavity via one of the infeed gates by the associated plastification and injection device so that a portion of this injected plasticized material flows via the other feed gate in the direction of the other plastification and injection device;

injecting another subquantity of the plasticized material into the mold cavity via the other infeed gate by the other plastification and injection device so that a portion of this injected plasticized material flows via the one infeed gate in the direction of the associated plastification and injection device; and alternately repeating said injecting steps to fill the mold cavity, whereby the molecular structure of the plasticized material is oriented to increase the strength of the resulting mold parts.

2. The process according to claim 1, further comprising supplying additional amounts of plasticized material via one or both of the plastification and injection devices to compensate for any shrinkage during cooling of the material.

3. The process according to claim 1, further comprising moving the material back and forth within said cavity by operation of said devices after said cavity has been filled.

4. The process according to claim 3, wherein the moving step is carried out in dependence on a cooling speed of the injection molded parts.

5. The process according to claim 1, wherein the alternate injection steps by said devices are paused between said devices.

6. The process according to claim 1, further comprising ventilating said cavity during the flow of the material in the direction of said other device.

* * * * *